US008386082B2

(12) United States Patent
Oswald (10) Patent No.: US 8,386,082 B2
(45) Date of Patent: Feb. 26, 2013

(54) UTILIZING CELL PHONE LOCATION FOR OCCUPANCY DETERMINATION AND HOME ENERGY CONTROL

(75) Inventor: James Ian Oswald, Hinckley (GB)

(73) Assignee: Alertme.com Ltd. (GB)

( * ) Notice: Subject to any disclaimer, the term of this patent is extended or adjusted under 35 U.S.C. 154(b) by 0 days.

(21) Appl. No.: 13/016,990

(22) Filed: Jan. 29, 2011

(65) Prior Publication Data

US 2011/0125329 A1     May 26, 2011

Related U.S. Application Data

(63) Continuation of application No. 12/843,756, filed on Jul. 26, 2010, which is a continuation of application No. 10/998,302, filed on Nov. 26, 2004, now Pat. No. 7,778,734.

(30) Foreign Application Priority Data

Nov. 23, 2003    (GB) .................................. 0327583.1

(51) Int. Cl.
*G05D 23/19*     (2006.01)

(52) U.S. Cl. ......... 700/276; 236/47; 236/51; 455/456.3; 455/457
(58) Field of Classification Search ................... 700/276; 236/47, 51; 455/456.3, 457
See application file for complete search history.

(56) References Cited

U.S. PATENT DOCUMENTS

| 5,115,967 | A * | 5/1992 | Wedekind .................. 236/46 R |
| 5,384,994 | A * | 1/1995 | Borba ............................. 52/261 |
| 6,400,956 | B1 * | 6/2002 | Richton ..................... 455/456.3 |
| 2003/0050737 | A1 * | 3/2003 | Osann, Jr. ..................... 700/276 |

* cited by examiner

*Primary Examiner* — Tejal Gami
(74) *Attorney, Agent, or Firm* — Cherskov Flaynik & Gurda, LLC (57) ABSTRACT

A cell phone location-based system is described that determines the occupancy of a home and controls home energy consumption such that energy is saved when the home is unoccupied. Occupancy is determined according to cell phone locations, occupant behavior patterns, or burglar alarm status. When an occupant is determined to be returning to their unoccupied home, the heating or cooling apparatus is activated to return the temperature in the home to a comfortable level by the time the occupant arrives.

10 Claims, 9 Drawing Sheets

UTILIZING CELL PHONE LOCATION FOR OCCUPANCY DETERMINATION AND HOME ENERGY CONTROL

The instant application is a continuation of U.S. application Ser. No. 12/843,756 filed on Jul. 26, 2010, currently pending, which in turn is a continuation of U.S. application Ser. No. 10/998,302, filed on Nov. 26, 2004, patented as U.S. Pat. No. 7,778,734 on Aug. 17, 2010, which in turn claims foreign priority benefit under 35 U.S.C. 119 of British Application Number 0327583.1, filed on dated Nov. 27, 2003.

TECHNICAL FIELD OF THE INVENTION

The invention relates to the field of household energy management and in particular to ways in which the behaviour of the occupants of a house, the thermal properties of the house and the operation of household appliances can be measured and modelled, in order to control the household appliances in a certain way or to recommend courses of action to the users of the system such that energy use by the household is made more efficient.

Throughout this specification, the words "house" and "household" are used for convenience but those words are not to be interpreted as limiting the scope of the invention to the context of separate, domestic dwellings. Among other things, the word "house" is intended to include within its scope an apartment, an office, a hotel room or a part of any of the aforesaid.

BACKGROUND OF THE INVENTION

There have been a number of patents in this field in recent years, which describe new hardware solutions to achieving a computer/Internet-controlled house and provide improved control of the energy consumption in the household.

In general the prior art in the computer-controlled house control uses several electricity sensors (one per appliance/wall socket) to monitor the electrical activities in a house. This large number of additional devices is complicated and costly. By basing the system on a single sensor it would be more suitable for retrofitting to existing houses with existing appliances. U.S. Pat. No. 5,572,438 by Ehlers describes a house system, which uses a first and a second microcomputer to monitor and control the energy in the household. The patent mainly describes the hardware required to deliver the improvements—microcompute-r, current sensors, appliance control and communication links to the outside world. The system requires a current sensor on each appliance. The hardware requirements for this system seem excessive and expensive to retrofit into an existing household.

U.S. patent application Ser. No. 2003/0050737 by Osann describes another arrangement of hardware, which suggests changing all or several of the electrical wall sockets within the house. It includes suggestions of including video cameras, intercom, and motion detector and temperature sensor in each of these replacement wall outlets. This appears an excessive use of technology with an extensive requirement for hardware and installation work by skilled electricians. Many of these features will not be valued by householders who are happy to not have video cameras in the house. The main financial saving to the householder is through improved temperature control and the additional systems seem excessive. However, the patent application does describe (in claims 81 and 82) a method whereby all of the house electrical current changes can be monitored from a single location in or near the circuit breakers. This seems a much simpler and cheaper approach, which will suit retrofitting of existing houses. However, this idea can be used more effectively with further analytical/mathematical tools run on a computer and with additional moveable adaptors to which it can communicate, as described herein.

An electronic control system for a house is currently on sale from Honeywell Controls under the registered trade mark Hometronic. The system is described on their web site. The Hometronic system uses a single central controller to determine on and off times for appliances and heating appliances around the house. It can connect to the Internet and be controlled via the web from anywhere in the world. However, it relies on one control device being attached to one appliance to provide on/off control and this makes it an expensive system to retrofit.

U.S. Pat. No. 5,115,967 describes a mathematical method of predicting the transient thermal behaviour of a house climate control system (heating/cooling system).

It is already known to use infrared sensors to determine occupancy in the house and to use this information to control house energy systems. An example of this is given in U.S. Pat. No. 6,324,008.

U.S. patent application Ser. No. 2002/0095269 discloses an appliance monitoring system, in which a subsystem incorporated in each appliance monitors parameters such as the number of cycles and the energy consumption of the appliance. In the event that the appliance needs attention, the system alerts the user or a service centre.

Microchip Technology Inc is a supplier of microchips. They have posted an article entitled "Microchip watt-hour Meter using PIC16C923 and CS5460" on their website discussing how to use one of their chips to make a watt hour meter. The power measurement integrated circuit CS5460 from Cirrus Logic/Crystal Power Measurement is used with the microcontroller PIC 16C923 to make a power meter. The CS5460 measures the instantaneous voltage and current four thousand times a second and uses these measurements to compute instantaneous power, $V_{RMS}$, $I_{RMS}$ and accumulated energy. Once the accumulated energy has increased by 10 Watt·seconds a pulse is generated at the output pin (EOUT pin) for counting by another device to form a consumption meter. The article explains how to use this device to record total power consumption.

SUMMARY OF THE INVENTION

In a first aspect, the invention provides a household energy management system comprising at least one sensor, which measures energy use by occupants of the house; a modelling means, which uses the energy measurements from the sensor to build a model of the behaviour of the occupants; and a controller, which controls the operation of one or more household appliances in the house on the basis of the model.

The modelling means may build a predictive model of the pattern of behaviour of the occupants over time, in which case the predictive model may be continually refined in response to new measurements by the sensor.

A model of the predicted behaviour of the occupants of a house allows more efficient use of the appliances in the house. For example, the predictive model may predict the times when the house will be occupied in order for the controller to control the operation of one or more household appliances, such as heating or cooling appliances, on the basis of the predicted times when the house will be occupied.

Additionally, or alternatively, the modelling means may build a temporary model of the current behaviour of the occupants.

A model of the current behaviour of the occupants of a house also allows more efficient use of the appliances in the house. For example, the temporary model may allow the controller to control the operation of heating or cooling appliances to achieve a desired temperature according to the current level of activity of the occupants.

The model of the behaviour of the occupants may include a determination of whether the house is occupied. To assist in this, the modelling means may have an interface with an intruder alarm system in the house and may receive signals indicative of the location of the occupants derived from, for example, a mobile phone network or a global positioning system. In a further enhancement, the modelling means can use the location signals to predict when the occupants may return to the house.

One application of the behaviour modelling means is to trigger an alert when an unexpected pattern of behaviour is detected. For example it may warn when an elderly person becomes immobile or when activity is detected in the house while the occupants are away.

Preferably, the sensor measures electrical activity within the house. The sensor may be a moveable sensor for location between an electricity supply outlet and an individual electrical appliance to measure the energy use by that appliance; or a fixed sensor on the household electricity supply to measure the respective energy uses of a plurality of electrical appliances connected to the supply. The optimum combination is one fixed sensor and a few moveable sensors, as described below.

In a second aspect, the invention provides a household energy management system, comprising at least one sensor on the household electricity supply for measuring the instantaneous total power delivered by the electricity supply; means for identifying electrical appliances connected to the supply on the basis of their respective start-up characteristics when the appliances are switched on; means for comparing the sensed start-up characteristics with reference characteristics; and means for warning a user of the system when the sensed characteristics differ from the reference characteristics by more than a predetermined limit.

The comparison means may further compare operating characteristics and/or shut down characteristics of the appliances with corresponding reference characteristics.

The system may further comprise means for recording the total time of operation and/or the number of cycles of operation of each appliance, which can be compared against a database of lifetime expectancy and reliability for different appliances. The database may be a local database, internal to the system, or a shared database, accessed via an external network. In the case of a shared database, means are preferably provided for updating the shared database with measured lifetime and reliability data for appliances connected to the system.

The system may further comprise modelling means receiving signals from the comparison means and from the database in order to recommend to the user of the system a program of maintenance or replacement of the appliance.

The household energy management system according to the second aspect of the invention may further comprise one or more temperature sensors for measuring the temperature inside the house; a source of information about the temperature outside the house; a modelling means, which uses the inside and outside temperature measurements to derive a transient thermal model of the house, which can predict changes in the inside temperature on the basis of the information about the outside temperature and on the basis of the operation of heating and/or cooling electrical appliances identified as connected to the supply; means for comparing the derived transient thermal model with a reference transient thermal model; and means for warning a user of the system of poor thermal properties of the house or of poor efficiency of the connected heating and/or cooling electrical appliances when the derived model differs from the reference model by more than a predetermined limit.

In such a system, the derived transient thermal model may be periodically updated and the reference transient thermal model may be a derived transient thermal model from an earlier period, whereby the warning means are for warning the user of the system of deteriorating thermal properties of the house or of deteriorating efficiency of the connected heating and/or cooling electrical appliances.

A household energy management system in accordance with the invention, which monitors the energy consumption of household appliances, can also act as an electricity meter and may indicate the electricity consumption reading to the householder or transmit the reading directly to the electricity provider. If the system is networked to the electricity provider, then the provider can inform the system of changing electricity prices. The system may simply inform the user of these prices or it may be programmed to control household appliances so as to minimize the energy costs to the householder. For example, it may be more cost-effective to increase the background temperature of the house by operating electrical heating appliances at a time of day when electricity is relatively cheap in order to reduce the amount of heating required when demand is at its peak. Alternatively, the electricity provider may be given direct control of the electrical heating appliances.

Similarly, if the system is networked to a gas supplier, then the supplier can inform the system of changing gas prices. The system may simply inform the user of these prices or it may be programmed to control household gas appliances, such as a gas-fired central heating boiler, so as to minimize the energy costs to the householder. Alternatively, the energy management system or the gas supplier itself may be given direct control of the gas supply via an electrically-operated gas valve.

Methods of operating a household energy management system in accordance with the first, second and third aspects of the invention are also provided.

The modelling functions associated with any of the aspects of the invention may be carried out locally, by computing means provided as part of the system within the house; or remotely, by external computing means accessed via a telecommunications network.

The system allows for standard appliances to be used. Intelligent appliances containing communications and mini-computers can be included but are not essential for this invention. The invention concentrates on using electrical sensors external to existing appliances and linking this to powerful analytical mathematical modelling.

The overall system benefits include:

Reduced energy consumption.

Improved householder comfort.

Improved maintenance and utilisation of expensive capital appliances in the house.

Reduced cost to the householder through improved energy tariffs.

Recommending energy saving measures to the householder based on actual measurements of the householder's behaviour, the thermal efficiency of the house and the operational efficiency of household appliances.

DESCRIPTION OF PREFERRED EMBODIMENTS OF THE INVENTION

A Typical System

Consider a system, which uses a single central sensor to monitor the flow of electricity into the house. It records/analyses the data in great detail—not only on a minute by minute basis but also the instant an appliance is turned on it analyses the starting current in detail over milliseconds. In this way it determines which appliance has been turned on and how long it has been on for and at what time of day it has been used. It builds mathematical models of:

All Appliances Used in the House and Their Pattern of Use

The House's Transient Thermal Behaviour Under Heating and Cooling Conditions

The system is intended not just to monitor the electrical system or the gas heating system but to link the monitoring of gas and electricity together to allow a whole system understanding to be achieved and provide better optimisation of the total energy use within the house. For example, sudden changes in electrical activity can indicate that the householder has returned home early from work and elicit a heating response within the controller to increase the house temperature.

These sensors include not only a single central sensor at the point of entry of electricity to the house but also adaptors, which plug into standard wall sockets. The adaptors allow the collection of detailed information and control the appliances they are connected to.

The analysis is performed on computers either local to the house or on the Internet. Communications between the various system items use standard known communication systems i.e. phone, radio, Internet or communication by power cable.

Figure 1:
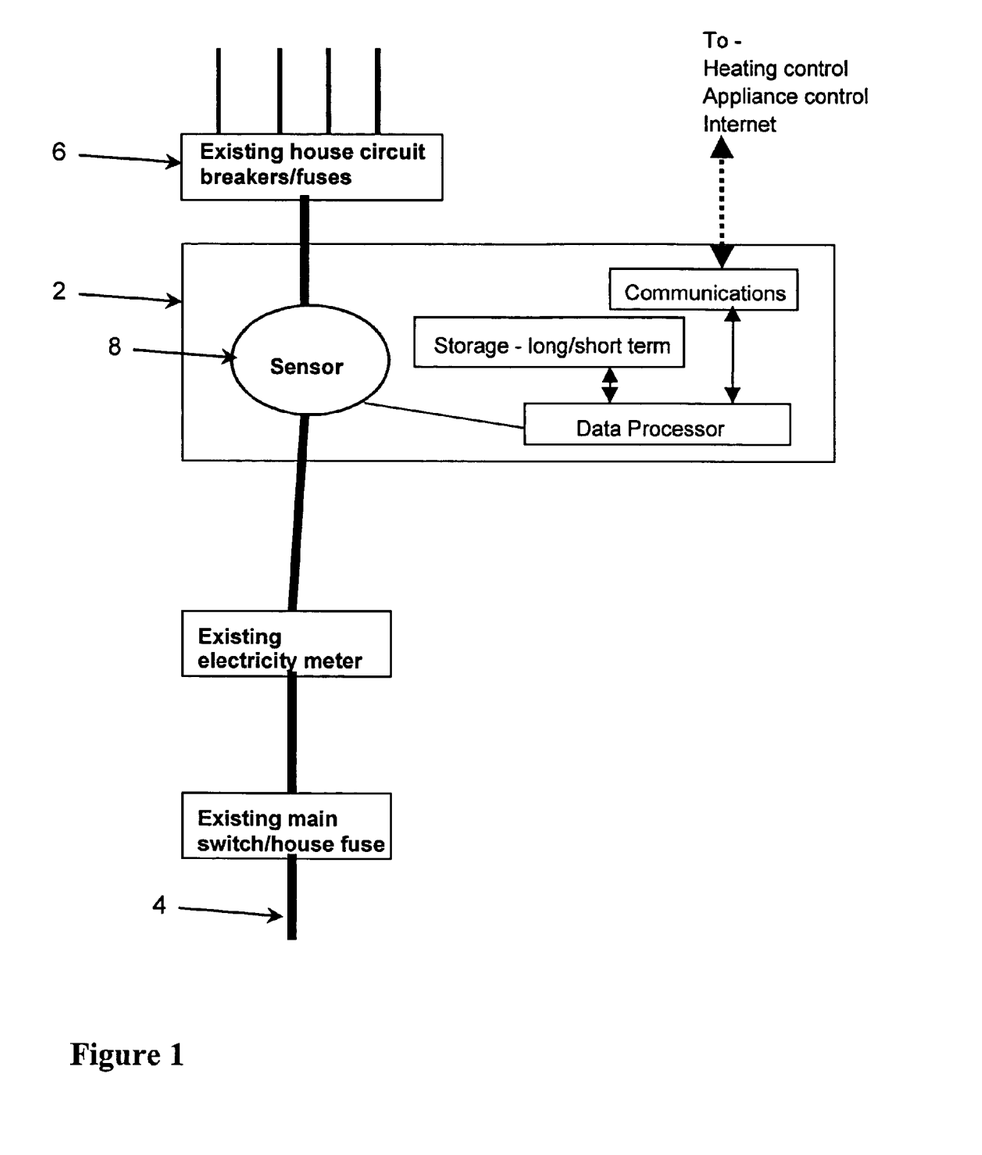
FIG. 1 shows a first way of installing a single central sensor in accordance with the invention into a household electricity supply.
Figure 2:
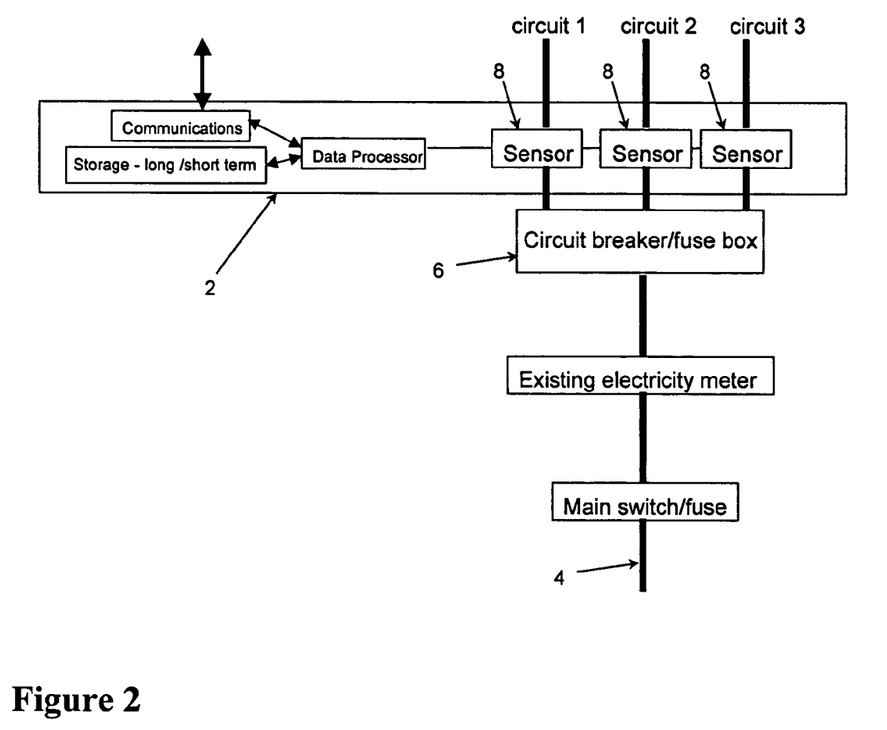
FIG. 2 shows a second way of installing a single central sensor in accordance with the invention into a household electricity supply.

The Single Central Sensor (FIGS. 1 and 2)

The single central sensor 2 shown in FIG. 1 is connected between the electric power cable to the house 4 and the house circuit breakers/distribution board 6, or in other words at the electrical point of entry to the house. The sensor 8 is used to monitor multiple devices. In more advanced versions, greater resolution may be possible by locating a sensor on each ring main out of the electricity meter, as shown in FIG. 2.

The single central sensor 2 monitors the electrical power feeding into the house (e.g. current, voltage and power factor), stores appropriate data and analyses the data to determine what is happening with the house's appliances and with the occupants. The single central sensor 2 contains electronic computing capability including storage (long and short term), processing power, battery back up (not shown) and communications capability with the wider network and local devices.

Figure 3:
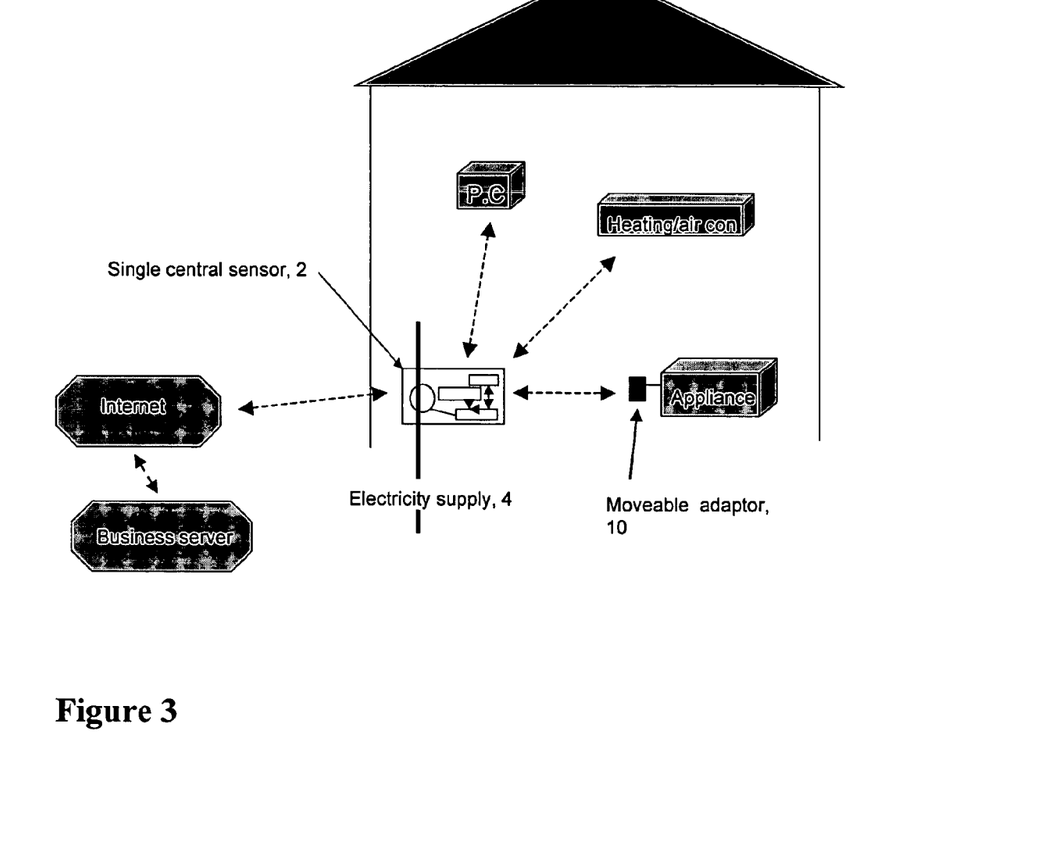
FIG. 3 shows the communication links between the single central sensor and the other parts of the system according to the invention.
Figure 4:
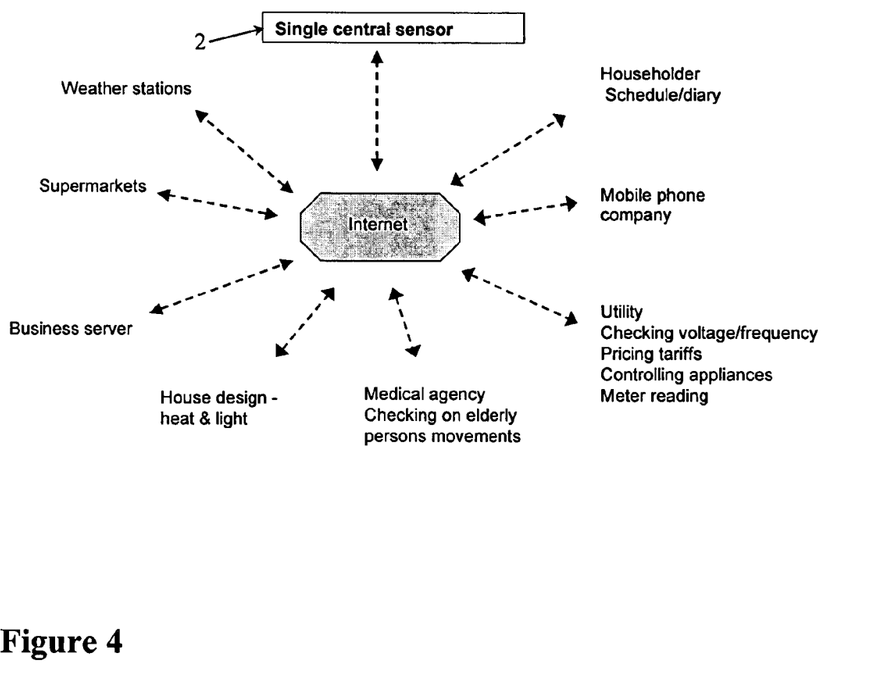
FIG. 4 shows various Internet services to which the system according to the invention may link.

Communications (FIGS. 3 and 4)

Existing communication methods will be used with the system to allow communication between all parts of the system including Internet servers, databases of information, the single central sensor 2, the moveable adaptors 10, the householder's personal computer and the householder's mobile phone etc, as shown in FIG. 3. These existing communication methods include the well-known methods of linking by telephone, radio, cable and communications by power cable. The system designer will simply use the most appropriate available technology to achieve the communication required. FIG. 4 illustrates in more detail the type of information that may be sent to and from the system over the Internet, as well as the sources and recipients of that information.

Stored Data

The data acquired will be stored on a database. This will include data of appliance characteristics, times appliances are on and off and derived data. It can be stored either within the house in some form of small computer, perhaps as part of the single central sensor 2, or on a more powerful server on the Internet-based network of computers.

Figure 5:
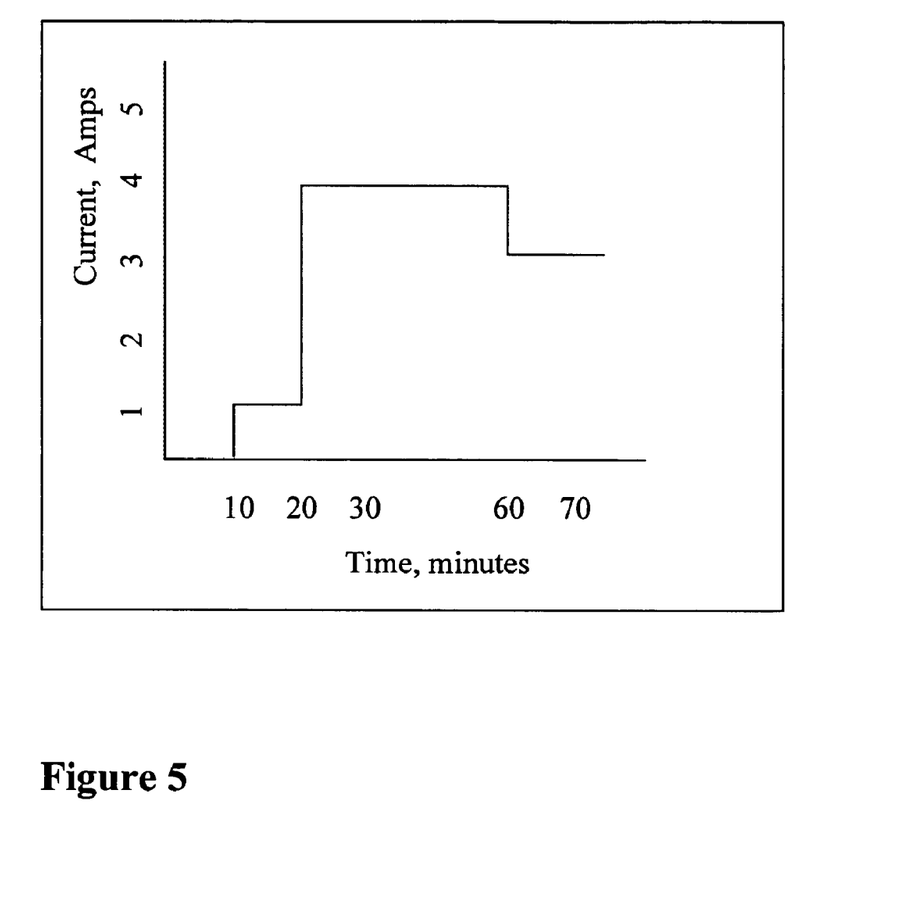
FIG. 5 illustrates how the current in a household electricity supply may vary with time.
Figure 6:
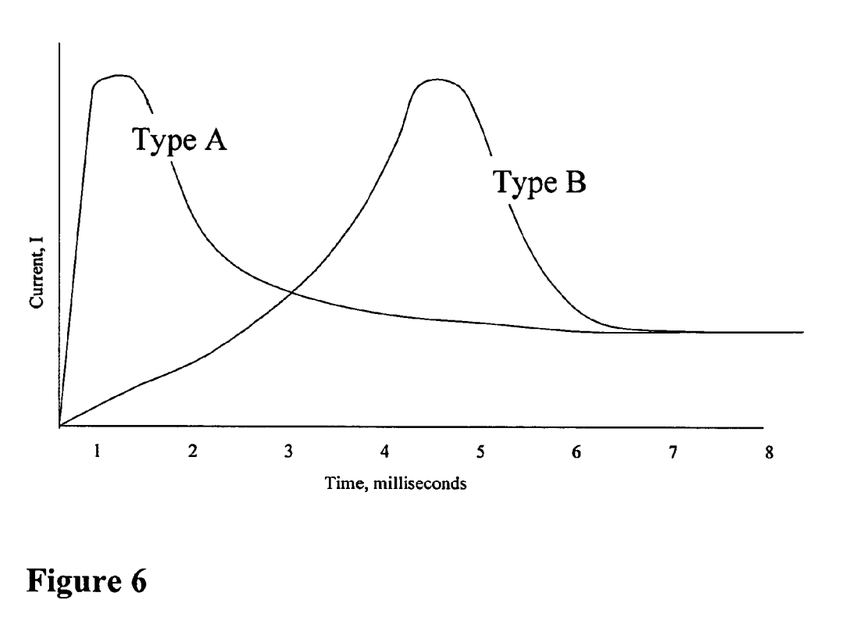
FIG. 6 illustrates the current start-up characteristics of two household appliances

Monitoring Appliance Use (FIGS. 5 and 6)

The system can determine the starting and stopping of appliances used in the house by monitoring the magnitude of current step changes. Consider the example shown in FIG. 5. At time 10 minutes an electric light of current 1 Amp is turned on. Ten minutes later a heater of 3 Amp rating is turned on and at time 60 minutes the electric light is turned off. At this point in time the system knows that the light has been on for 50 minutes and knows its power and can therefore calculate the energy consumed by the light (kW·h). At the end of the day the system is able to summarise how much energy each of the house's appliances has used during the day. This can be provided as a summary to the householder such as on a web page or email.

The actual type of appliance started can be determined by analysing the start-up characteristics. As shown in FIG. 6, some appliances have quicker response characteristics than others. Type A and Type B have similar final operating currents but they differ in start-up characteristic. Type A has a quick peak in current, suggesting that it is a resistive load like a light bulb, which has a low resistance when cold but this resistance increases once it is hot and consequently the current falls. Type B takes longer to reach its peak current, perhaps indicating that it is a motor with a magnetic reluctance rather than a resistance and a starting inertia quite different to the type A appliance. The system can recognise the appliances by comparing them to a pre-programmed store of characteristics, which are loaded on the single central sensor 2. These signature characteristics will be pre-programmed into the single central sensor 2 before installation in the house, so it can recognise what is being turned on and off. Alternatively the system can learn the signatures during use.

It will be possible to teach the system to recognise a new appliance if it is not immediately recognised from the data bank of known appliances. For example, if the householder starts using an old valve-driven radio which is not previously known, the single central sensor system may identify that an 'unknown appliance' has been used and email the householder asking what the appliance is. By replying, the householder will teach the system to recognise the valve radio for next time. This new characteristic can be used by the householder's system and also sent electronically to the other single central sensors on the Internet network for use in other houses.

Clearly a householder will use some appliances of identical power rating and very similar start up characteristic such as similar light bulbs. The single central sensor has two ways to address this issue. It can determine the difference by noticing small differences in start-up characteristic which arise from small changes in reluctance and resistance due to cable length differences or it can make a best approximation to what is happening in the house. Any approximation will lead to some uncertainty and error, however few appliances are exactly identical and so the error will be small. Alternatively moveable adaptors 10 can be used between the appliance and the fixed wall outlet. These are explained in more detail below.

New versions of control software can be sent to the single central sensor 2 through the network communications.

Initiating the System

On first installing the system it may be best if the householder runs through an initiation sequence whereby each appliance is turned on and off in a predefined sequence. For example, the householder might be asked to follow the following initiation sequence:

Turn all household appliances off
Turn all appliances in Bedroom 1 on
Turn all appliances off
Bedroom 2 all on
Turn all appliances off
Bedroom 3 all on
Turn all appliances off
Kitchen all on
Turn all appliances off
Living room all on
Etc This method allows the system to learn in which room each appliance is kept. For example the 30 W radio might be in Bedroom 1. This helps communications between householder and computer if the location of appliances is known. An initiation sequence like this is already described in U.S. patent application Ser. No. 2003/0050737.

The householder will be able to access data records of appliance use and so will be able to inform the system of the whereabouts of any appliances that the system cannot directly deduce. So for example if the householder can see that the system did not correctly identify that a TV had been moved from the lounge to bedroom 1 the householder will be able to update this over the Internet interface (standard HTML web pages with radio buttons etc).

Alternative Way to Teach the System to Recognise Appliances

An alternative way to teach the system to recognise appliances is to include at least one moveable adaptor 10 as part of the system. This is an adaptor which fits between the appliance power plug and the fixed wall outlet.

It may contain electronics that allow it to measure the current flowing into the appliance, in much the same way as the single central sensor 2 and communicate this to the single central sensor.

Alternatively, the moveable adaptor 10 may just include a transponder, which sends a simple signal to the single central sensor 2 informing it that current is flowing. In this way the single central sensor 2 can associate any transponder signals from the adaptor 10 with the instantaneous changes in household current already detected by the single central sensor 2.

The moveable plug adaptor 10 will help with identification of identical appliances. For example, if two appliances are turned on at the same instant in time it may become difficult to determine what has happened. In general this can probably be ignored, as it is unlikely that appliances will turn on over the same millisecond and any errors introduced in this way will be a small part of the total electrical consumption.

However it may be prudent to use an adaptor 10 with high consumption appliances so that more detailed data can be provided to the system. If, for example, a washing machine were fitted with one of these then the adaptor 10 would signal when current flows through it and the single central sensor 2 would know the difference between this appliance and other general appliances being turned on in the house.

The adaptor 10 could also be used to turn on and off the appliance, whereby the system could manage the appliance to run at night when electricity is cheaper.

A further advantage of the moveable adaptor 10 is that it can be moved to a different wall outlet. For example, if the system recognised and learned the behaviour of a refrigerator at the first outlet it could email the householder and request the householder to move the adaptor to a new outlet. The message might read: 'At 18:06 this evening an appliance was turned on of 60 watts and the system can not determine what it is. Please move Mobile Adaptor 3 from current location on refrigerator to the outlet socket using this appliance and allow the system to learn the characteristics of this appliance. Thank you—Click here if you do not want another email reminder of this event.'

Eventually the householder may settle on having a few of these mobile adaptors 10 in the house, some of which are permanently connected to important appliances and are used to monitor and control these appliances directly. The remainder of these moveable units 10 may be moved around the house at the discretion of the householder and in sympathy with requests from the networked control system.

Another advantage of using a moveable adaptor 10 is that it could recognise which appliances use significant electricity even when turned off or in standby mode. It is common for household appliances to use built in transformers, which use considerable energy heating the transformer even when the appliance is effectively turned off. The adaptor will inform the central monitor of power at all times and the system can then recognise that the appliance is consuming whilst in standby mode and send an email to the householder recommending that the appliance be disconnected from the mains when not in use.

Whenever the householder buys a new appliance he would be best advised to connect it with an adaptor 10 for the first few days of operation so that the system can learn the start and stop characteristics of the appliance. This allows the system to evaluate the consumption rate of the appliance and email recommendations to the householder such as above.

The adaptor 10 could be fitted with additional devices to provide location information to the system. For example it could emit a radio signal which is used to triangulate its physical position in space. In this way the central detector could determine the physical location of appliances such as upstairs, 3 meters north, 1 meter east. In this way a detailed map of both the appliances and the location of a householder using an appliance can be pinpointed. This all helps to populate a detailed appliance database and improve communication between the system and householder.

By having a mobile adaptor 10 and rotating it between electrical sockets, the system can use fewer special adaptors than the prior art systems which have permanently fixed adaptors.

Behaviour Pattern Analysis

Analysing the stored data can provide information on the householder's patterns of behaviour. It will be possible to observe patterns of behaviour over a weekly basis. For example, the system can notice that every Tuesday the television is switched on at the same time of day and notice on Fridays that the householder gets home 2 hours later than on other workdays. Having detected these patterns of behaviour, the system can alter the control of appliances to provide improved comfort and cost to the householder. This is particularly useful in optimising high energy-consuming appliances such as heating and air conditioning. So on the days that the householder is expected home late the system can defer heating the house to its full temperature until just before the householder is expected. Other applications would be to cook or defrost food in anticipation of the householder's arrival, to complete a washing machine cycle at a time when the householder is likely to be available to remove the washing or to record automatically a television programme that the householder regularly watches. The householder would have to agree to this level of autonomous control and would interface with the computer via the communications network either through a web page or through an interface panel within the house.

Instantaneous Behaviour Analysis

In addition to building a model of the historical behaviour of the occupants of the house, the system can detect the instantaneous behaviour at any one instant and this can be used to modify the energy control parameters.

Appliances are generally turned on when an occupant of the house presses a switch. The system can use this to determine what activity is taking place within the house. At any one instant in time the behaviour model can probably deduce how many occupants are in the house, where they are and a rough idea of what they are doing. This could be used to control the temperature of the room the occupants are in. Other rooms could be heated to a lower temperature (if individual room temperature control is available).

recognize a sudden change of behaviour such as an unexpected reduction in activity of an elderly or infirm person. The change in behaviour pattern can be used to email a warning to a nearby relative.

The single central sensor system can alter the control temperature of the house if the householder is obviously active or has gone out. The activity level of the householder can be inferred from the appliances detected within the house. For example, if the householder is using the vacuum cleaner the system might decide to reduce the control temperature within the house until the cleaning has stopped. A reduction in temperature can both reduce the energy consumed by the house and also make the environment more comfortable for the householder whilst they are exercising with the vacuum cleaner. On the other hand, if the system knows that only one person lives in the house and has noticed that the TV is switched on, it may be reasonable to deduce that the householder is static and a slight increase in house temperature would be more comfortable. If two people are in the house then a gated logic decision is required in the control functions to ensure the warmest state is chosen (e.g. the temperature is warmed for a static person even if other one is using the vacuum cleaner)

Alternatively, if the burglar alarm is set, then the system can deduce that all occupants of the house are out and lower the house temperature. A special transponder could be included in the burglar alarm to communicate directly with the single central sensor to inform it that the alarm is set and all occupants are out of the house.

The position and movement of the householder can be noted from the householder's mobile phone and the location detected by the phone network. If the wider system includes access to the mobile phone network then the distance of the householder from their home can be determined and if the householder is far away then the house temperature can be lowered. For example if the transient model says the house can be heated up to full temperature within 30 minutes and the householder is known to be more than 30 minutes away then the heating system can be turned off completely.

Location information could also be provided based on other monitored activities of the householder. For example, if the householder is using a computer at his/her workplace, then that computer or an Internet service provider could relay the householder's location to the household energy management system. The system could also be networked with other locating systems, such as a congestion charging system that would monitor the location of the householder's car.

In summary, the household temperature can be linked to the activity of the householder and his actual location rather than being linked to a time clock as with current house heating systems.

Meter Reading

The system builds up and records detailed energy consumption data and by integrating this over time it can record the total energy (kW·h) used and so become an energy meter. This allows billing information to be sent to the customer and the utility directly over the communications network, as shown in FIG. 4.

Not only can the system determine the total energy consumption over the day or week, but it also knows what time of day these units of electricity are used. This enables it to be used by a utility selling electricity to offer the customer variable tariffs during the day or during the week or month. So a customer could chose a tariff arrangement, which gives low price electricity most of the time but very expensive electricity at peak times of demand. This option is already available industrially but is too expensive to meter for small scale domestic users. A customer choosing such a tariff arrangement would save money by getting a better rate for general consumption and as long as consumption is minimised during peak hours would save overall. (It should be noted that in the U.K.'s electricity market, peak hourly electricity prices during the year can reach 100 times average electricity price and so it would be important for the householder to know when to cut back.)

This variable tariff system could become quite sophisticated offering different rates over the course of one day and different rates from day to day. The customer could be kept informed of these tariffs over the Internet interface available through the total networked system or through daily emailed updates of any rate changes.

The system can identify when the householder operates high consumption appliances and may benefit by altering the time of operating these appliances—e.g. turning the washing machine on at a night when electricity is cheaper.

Interaction with Energy Utility

The system described can be integrated to communicate directly with the supplier of energy. For example a feature can be included, which allows the electricity supplier to turn appliances on and off to smooth the peak demand which occurs on the grid network. The householder would benefit through a price reduction under such an arrangement.

It is also possible to allow the gas supplier to control the gas heating of a house. For example, on the coldest winter days the gas supplier knows that demand is going to peak at its highest level of the year and may not have the capacity to pass enough gas down the pipelines to meet demand. With the proposed system it is possible for the networked houses to have heating turned on a few hours early such that the house is pre-warmed before peak demand time. Although this is likely to increase the total gas consumption it will reduce the peak demand later in the day and has this operational benefit to the gas supplier who can avoid building additional gas transmission pipelines and pumping equipment. The customer can be encouraged to buy into this scheme through improved annual prices.

Monitoring Electrical Quality

The single central sensor 2 located at the point of electrical entry to the house can be used to monitor the quality of electricity supplied to the building. In this way it can monitor not only total loss of power during power cuts and its duration but also alterations in frequency, brief spikes of power, dips in voltage. This information can be useful to the householder in monitoring the quality of electricity supplied. If the electricity does not meet requirements, the householder has the opportunity of demanding compensation or improvements from the supplier with the evidence provided by the single central sensor 2. Communication could again be achieved through the Internet, such as web page access or email.

Figure 7:
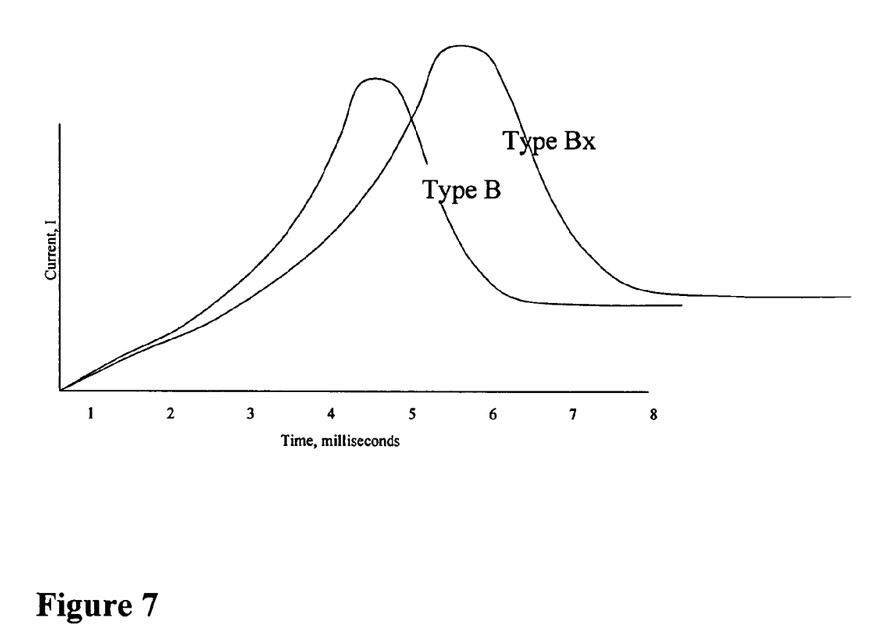
FIG. 7 illustrates how the start-up characteristic of an appliance may change over time

Appliance Health Monitoring (FIG. 7)

The system can be used to compare the start-up characteristics of each appliance on a day-by-day basis. In this way the system can monitor the health of the householder's appliances and warn of problems. For example, an electric motor in a washing machine may have a start-up characteristic when new of Type B, as shown in FIG. 7. However, the characteristic of the motor will change as the motor ages and the bearings stiffen and the brushes wear. Towards the end of normal life, the brushes may arc and the motor will take longer and/or require more current to reach speed. This can be monitored by the single central sensor 2. The analysis software can detect these changed characteristics (such as a move to characteristic Type $B.sub.x$) and compare them to known acceptable behaviour. If the appliance falls outside predetermined limits then an alarm (e.g. an email/text message) can be sent to either the householder or a maintenance technician who can arrive and fix the motor before it fails. Early warning like this provides the householder with preventative maintenance, which reduces the inconvenience and cost of unexpected failures.

The single central sensor could monitor for arcing across the brushes of a motor and to include this function it would monitor for electrical noise during continuous operation, and not just the motor start-up characteristics.

The system will be able to carry out optimisation calculations and recommend to the householder whether an appliance is worth repairing or is best replaced. For example, it may calculate that the washing machine, which is about to fail, has a high probability of further failures (based on a database of typical failure rates). It may find that the cost of two repairs in succession combined with say improved energy consumption of the latest appliance would mean that the householder would be best to replace the appliance rather than repair it. An appropriate message can be sent to the customer with or without an option to buy a replacement appliance through the system. This sort of calculation could be quite detailed including interest rates, probability of failure rates and details on spare parts costs, a database of known appliances and their life expectancies. It offers an online optimisation cost calculation, which is not currently feasible to a householder.

A further appliance health monitoring method is available through counting the number of cycles and hours of operation an appliance has completed. In this way any appliance can be monitored for life consumed and an estimate made of remaining life based on a database of typical expected lifetimes for appliances such as fridges, freezers, cookers or heating boilers. This database could even include model specific data for improved accuracy.

Over time the networked system would learn by itself and build its own life expectancy databases from its own data. This database would be useful as a way of evaluating the value of different appliances and recommending longer-lived appliances for householders to buy.

Transient Thermal Model

A transient thermal model of the house can be generated and validated by the system. It can be used to:

Determine when the heating should be turned on and off and so optimise the use of the heat consumed.

Carry out health monitoring of the heating/insulation systems and recommend maintenance actions.

Compare the House to Other Houses or Standard Models of Average Houses

A transient thermal model of the house heating is a mathematical model of the house heating characteristics including terms for the steady state heat loss and also terms for its transient thermal performance. For example, a heavy, brick built house will take longer to heat up and cool down than a lightweight, wooden/fibreboard construction and terms in the mathematical model are included for mass, thickness and specific heat of materials etc.

Terms in the thermal model would include:

Heat transfer coefficient inside house.

Heat transfer coefficient outside house—terms including effect of wind, rain, humidity etc.

Temperature inside.

Temperature outside.

Materials of construction including thickness, thermal insulation qualities, mass, specific heat.

Wind resistance of apertures such as doors and windows.

Figure 8:
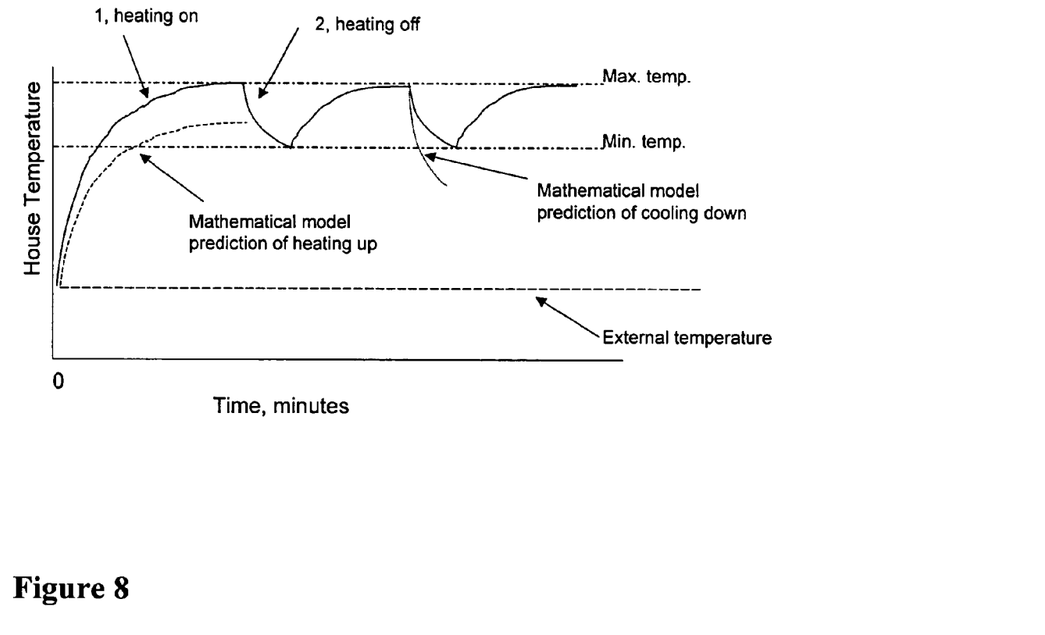
FIG. 8 shows how a transient thermal model in accordance with the invention may be revised.

These parameters can be estimated at first from the householder informing the system of the age of house and its type of construction. From then on the model will measure the actual response of the house to varying thermal conditions and adapt the mathematical model until a good fit is obtained between actual response and mathematically modelled response. This is illustrated in FIG. 8.

At time 0 the heating is turned on and the actual temperature rises (as shown by Line 1) until it reaches the control temperature at its peak and the heating is turned off. From here the temperature falls according to Line 2 until the minimum temperature is recorded and the heating is started up again. By sensing the electrical operation of heating controls such as a thermostat or gas valve, the single central sensor 2 will detect the time points when the maximum and minimum temperatures are reached and it can compare the actual times to the mathematically predicted response. Differences in these two will demand the software changes the coefficient terms in the model until the best fit with all known data is achieved. For the first few days the system may be inaccurate, but later once a larger database of known heating and cooling times is known the mathematical model will become increasingly accurate.

The system can use network data to improve validity. For example it can be informed of local weather from existing Internet weather databases which have weather information from nearby weather stations.

Improved Heating Control

In traditional systems the householder uses a time controller to define when the heating (or air conditioning) should turn on and off. With the use of the transient thermal model, the householder can now define when the house is to reach the controlled temperature schedule rather than when to start heating. This allows the single central sensor system to calculate the optimum time to turn on. For example, say the householder returns home at 17:30 in the evening and wants the house at the desired temperature at 17:30. The system can use the transient model to calculate the time it will take to reach the desired temperature: on a cold windy day this might be 1 hour and on a mild day it might be 30 minutes. In this way the heating system is turned on for the minimum time and the house consumes the minimum heat energy.

Figure 9:
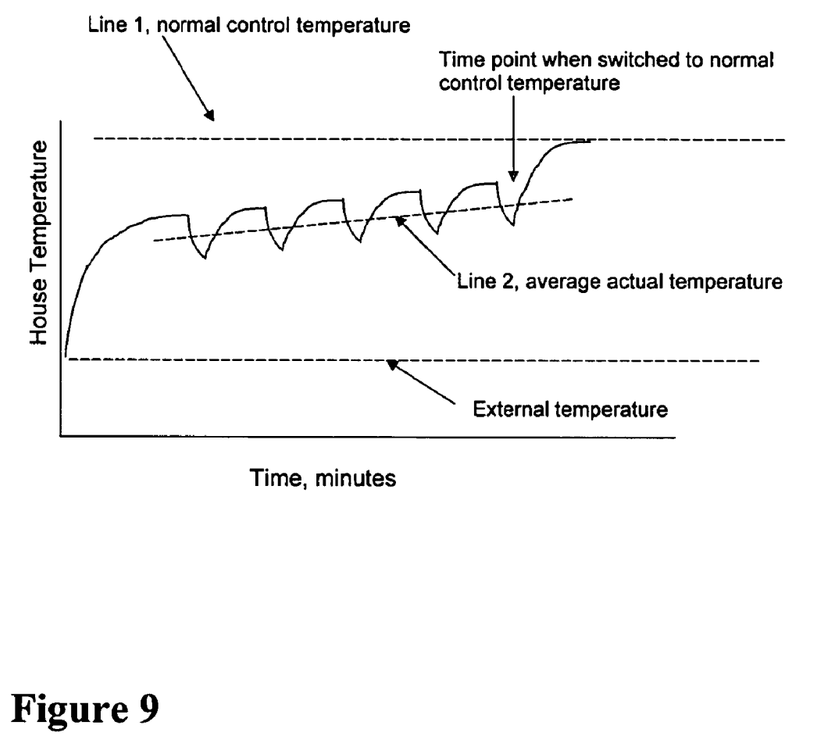
FIG. 9 shows how a transient thermal model in accordance with the invention may be used to control temperature with no feedback.

Control to a Lower Temperature than the Thermostat Set Temperature (FIG. 9)

The transient thermal model can be used to provide a crude control system without referring to the house thermocouple temperature sensor. This would allow the system to control to a reduced temperature (Line 2) without alteration to the existing thermostat fitted to an existing house heating system, which is set at a higher temperature (Line 1). FIG. 9 shows how this would happen. The transient model would be used to determine how fast the house heats up and cools down and the heating appliance (such as a gas boiler) would be turned on and off in response to the mathematical prediction of internal temperature in order to maintain the temperature close to a desired average. This does not require a house thermocouple for feedback, which means it would have a tendency to drift in temperature, as seen in the slope of Line 2 in FIG. 9. This is unacceptable in the long term but may serve for short periods when temperatures below the house thermostat set point are required.

Thermal Efficiency Monitoring

The validated thermal transient model can be used to compare the house to national house norms. In this way the thermal characteristics of the house can be compared to acceptance limits and weaknesses in the house thermal characteristics can be identified and remedied. For example the system may notice that the house cools down unusually quickly on windy days and yet has a normal cooling characteristic under still air conditions. This will indicate that the house is susceptible to wind and is therefore draughty. An email could be sent to the householder or maintenance contractor to investigate and remedy the situation.

Each of the terms in the thermal transient model can be compared in this manner and the house can be evaluated including the specific heat properties of building materials. Energy saving measures that are recommended in this way are thus based on actual measurements of the house characteristics, rather than generic recommendations which are given to all householders.

Heating Health Monitoring

The transient thermal model can be used to determine the operational health of the heating system within the house. As explained previously, the system will continuously adjust coefficients within the transient thermal model to ensure it aligns with the true house thermal response. Over months of operation, these coefficients will drift as the thermal characteristics of the house worsen with age. This will be most noticeable with a heating boiler as it becomes fouled through use—the house will begin to take longer to heat up. This gradual drift in characteristics can be used to monitor the degradation of the heating boiler and when a predetermined limit is met then maintenance action can be recommended to the householder or service provider. This active monitoring of boiler health will provide the householder with more optimal expenditure on maintenance, rather than just maintaining the boiler annually when it may still be in good condition.

It may be thought that a simpler health monitoring system would be to just monitor the time it takes for the house heating to reach temperature, without the use of the transient thermal model. However such a simple system makes no allowance for the changes in weather conditions that occur. By using the transient thermal model as the basis, changes in weather are automatically accounted for within the model leaving just deterioration in boiler efficiency as the remaining explanation for deteriorating performance.

On a system where the single central sensor 2 has difficulty detecting changes such as the electrically powered gas valve opening on the gas boiler, a special house thermostat that communicates with the single central sensor 2 can be used. This thermostat acts as a normal house thermostat—switching open and closed as the temperature rises and falls through set limits. However, it communicates this to the single central sensor 2 so that the system can still determine when temperature limits are reached and the transient thermal model can still be aligned with the real thermal response.

Managing the System

The system described is capable of making decisions for the householder on a minute by minute basis. Initially it will do this in a pre-programmed way—making assumptions about house temperature and timings that are best estimates. However, the system needs a method of improving, learning and adapting to the particular householder's preferences. The householder can do this by informing the system as to whether the result is acceptable. For example, if the householder finds the temperature one day to be too cool in the morning, the householder could open a web page interface window on the system's Internet interface and click appropriate pages to instruct the system that the wrong response was achieved. The more this is done the more the system will adapt to the actual preferences of the user.

The invention claimed is:

1. A cell phone location-based system for controlling heating or cooling appliances in a building, comprising:

means for determining the location of one or more occupants according to the location of mobile phones belonging to said one or more occupants, and calculating the expected transit time of at least one occupant, said expected transit time being a time of transit between the occupant's current location and the building location;

a modelling means responsive to the determined location of said one or more occupants, to the calculated expected transit time of the occupant between the occupant's current location and the building location, and to a transient thermal model of the building, said transient thermal model to predict based on a term describing a construction material of the building a response of the building to a varying thermal condition;

a controller responsive to said modelling means for automatically controlling the operation of building heating or cooling appliances, said automatic control based on said transient thermal model of the building;

wherein the modelling means determines that the building is unoccupied based on the location of said one or more occupants; and wherein the operation of said energy management system includes using the controller to automatically control said heating or cooling appliances, said appliance use setting based on response of the controller to said modeling means response to the determined location and the transit time and the transient thermal model of the building such that the energy consumed by said heating and cooling appliances is reduced for a period of time, followed by heating or cooling the building to reach a preferred temperature before the occupant's arrival at the building.

2. The energy management system according to claim 1 wherein the location of an occupant according to the location of their mobile phone is determined by a mobile phone service provider, and the expected transit time between the occupant's current location and the building location is calculated by the modeling means.

3. A building energy management system according to claim 1 wherein said modelling means is located remotely to the building and is accessed via a communications network.

4. A building energy management system according to claim 1 wherein said modelling means further determines that the building is currently unoccupied according to an indication supplied by a sensor which measures electrical energy use by the building or a portion thereof.

5. A building energy management system according to claim 1 wherein the determination that the building is currently unoccupied is further based on an indication supplied by a burglar alarm that the burglar alarm has been activated.

6. A building energy management system according to claim 1 wherein the modelling means further generates a transient thermal model said transient thermal model of the building is estimated based on at least one of construction and age information, the actual response of the building to varying thermal conditions, weather forecast data, wind speed data, and the heating or cooling ability of the heating or cooling appliances.

7. A building energy management system according to claim 1 wherein determining the location of an occupant according to the location of their mobile phone is performed with the aid of the Global Positioning System.

8. A building energy management system according to claim 1 wherein the controller shuts down the heating system on the basis of the transient thermal model.

9. A building energy management system according to claim 8 wherein the operation of said energy management system further comprises shutting down the heating system if the transient model indicates that a house can be heated to the required temperature prior to the estimated time of arrival of the occupants of the premises.

10. A building management system according to claim 1 wherein the transient thermal model is used to compare the building to national standards.

* * * * *